United States Patent [19]

Guazzo

[11] Patent Number: 4,595,256
[45] Date of Patent: Jun. 17, 1986

[54] CONNECTION BETWEEN THE ENDS OF TWO UNDERSEA OPTICAL FIBER CABLES AND METHOD OF MANUFACTURING SAID CONNECTION

[75] Inventor: Lucien Guazzo, Calais, France
[73] Assignee: Les Cables de Lyon, Clichy, France
[21] Appl. No.: 482,358
[22] Filed: Apr. 5, 1983
[30] Foreign Application Priority Data
    Apr. 8, 1982 [FR] France ................ 82 06152
[51] Int. Cl.⁴ ......................... G02B 6/38; H02G 3/00
[52] U.S. Cl. .......................... 350/96.21; 350/96.20; 350/96.22; 350/96.23; 174/70 R; 174/72 R
[58] Field of Search ............... 350/96.10, 96.20, 96.21, 350/96.22, 96.23; 174/70 R, 70 S, 71 R, 72 R, 72 A, 72 C

[56] References Cited

U.S. PATENT DOCUMENTS

| Re. 31,515 | 2/1984 | Heldt | 350/96.21 |
|---|---|---|---|
| 3,461,539 | 8/1969 | Napple | 350/96.2 |
| 4,081,208 | 3/1978 | Meade | 350/96.2 |
| 4,196,965 | 4/1980 | Matsuno | 350/96.21 |
| 4,264,128 | 4/1981 | Young | 350/96.2 |
| 4,330,171 | 5/1982 | Malsot et al. | 350/96.2 |
| 4,412,878 | 11/1983 | Guazzo | 156/91 |
| 4,516,830 | 5/1985 | Guazzo | 350/96.22 |

FOREIGN PATENT DOCUMENTS

| 2729682 | 1/1979 | Fed. Rep. of Germany | 350/96.21 |
|---|---|---|---|
| 2847384 | 5/1980 | Fed. Rep. of Germany | 350/96.23 |
| 3006131 | 9/1981 | Fed. Rep. of Germany | 350/96.21 |
| 56-12607 | 2/1981 | Japan | 350/96.23 |
| 2025650 | 1/1980 | United Kingdom | 350/96.21 |
| 2030723 | 4/1980 | United Kingdom | 350/96.21 |

*Primary Examiner*—William L. Sikes
*Assistant Examiner*—Brian M. Healy
*Attorney, Agent, or Firm*—Sughrue, Mion, Zinn, Macpeak, and Seas

[57] ABSTRACT

Each cable has an optical fiber core (1, 1') an arch of steel wires (2, 2'), a copper tube (3, 3') swaged onto the cylinder, an insulating sheath (4, 4') a return conductor (14, 14') and another sheath (16, 16') which is a protective sheath. Said connection has, at each cable end, a fixing part (8, 8'), a splaying out wedge (15, 15') and a plug of hardenable resin (11, 11'). The connection also has ports (12) provided in the fixing part (8) and, around the fixing parts, an inner tube (23) provided with ports (21) in which support wires (26) are placed, weld sleeves (28) connecting together the fibers (22, 22') being on said support wires by tapes (27) and slung across said ports, an outer tube (20) covering the inner tube, a sealing mould (31), a conductive metal braid (32) and a heat-shrinkable sleeve (33).

12 Claims, 6 Drawing Figures

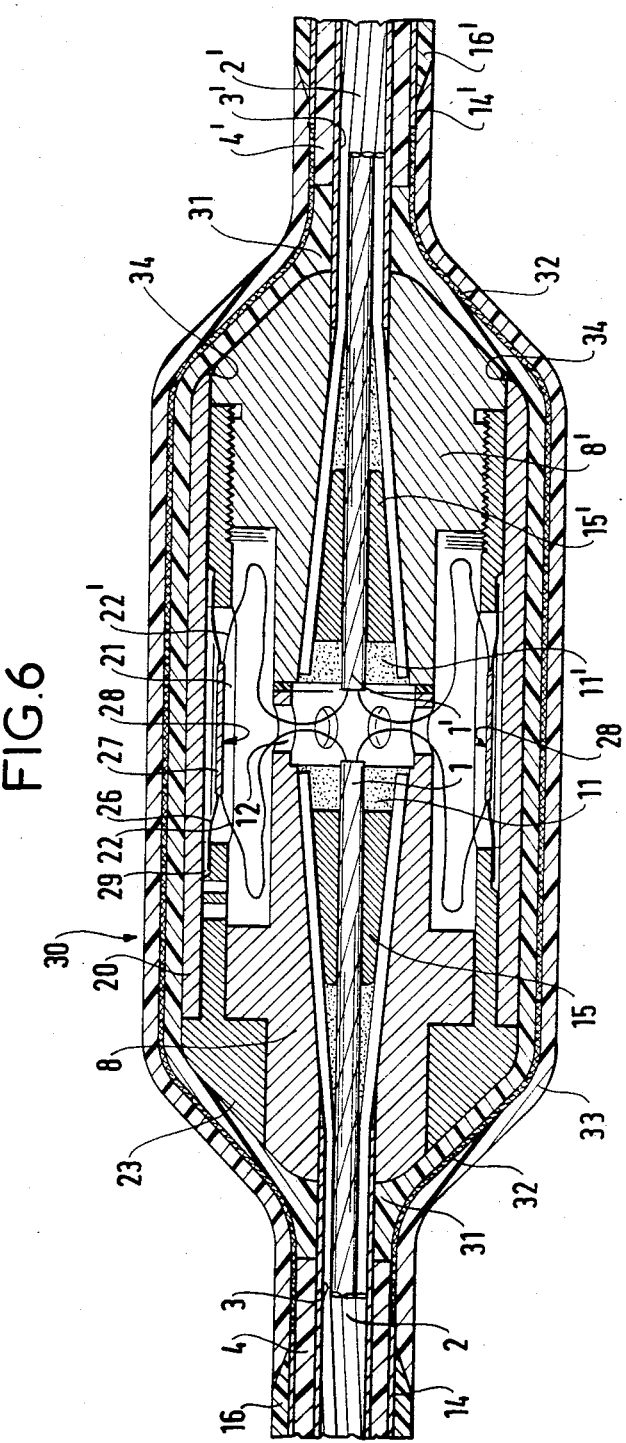

CONNECTION BETWEEN THE ENDS OF TWO UNDERSEA OPTICAL FIBER CABLES AND METHOD OF MANUFACTURING SAID CONNECTION

The present invention provides a connection for connecting the ends of two submerged optical fiber cables, each cable comprising an optical fiber core over which an arch of steel wires is helically wound, a conductive metal tube swaged down on the arch and an insulating sheath, said connection comprising at each cable end:
(a) a fixing part which is at least partially made of a metal having high mechanical strength, said fixing part having a bore which includes a conical portion at its end facing the end of the other cable and a cylindrical portion at its opposite end, said cylindrical portion accommodating the swaged down tube and said conical portion receiving the ends of the steel wires;
(b) A conical wedge for splaying out the arch-forming steel wires and jamming them in the conical portion of the bore, said wedge having an axial passage which accommodates the optical core;
(c) A hardenable synthetic resin plug which fills the free space between the surface of the fixing part bore and the outer surface of the conical wedge and surrounding the ends of the arch-forming wires;

It also relates to a method of manufacturing such a connection, in which method:
(a) The optical cores and the arch-forming steel wires, the swaged conductive tubes and the insulating sheaths are all stripped from the connection zone along a very much longer length than that occupied by the final connection, leaving the optical fibers bare;
(b) The outer sleeve, the inner tube and the fixing part are threaded in that order onto one end of the cable while the outer sleeve, the outer tube and the fixing part are threaded in that order onto the other end of the cable;
(c) The arch-forming steel wires, the tubes and the insulating sheaths are of a length as required for the connection;
(d) Hardenable synthetic resin is inserted into the conical portions of the bores through the fixing parts, and the ends of the arch-forming steel wires are splayed out inside said conical portions;
(d) The wedges for splaying out the steel wires are inserted into the fixing parts, so that the entire volume between the ends of the steel wires and the wedges is filled with synthetic resin which is then made to harden.

BACKGROUND OF THE INVENTION

When an undersea transmission line is being laid, it is impossible to avoid having to connect two cable ends together, especially during repairs at a point where the cable has been damaged.

An optical fiber undersea cable generally has a core with optical fibers (placed in the tubes of plastics substance which are filled with viscous substances or in helical turns on the periphery of a metal or plastics rod); a cylinder formed by steel wires helically wound and covered by a ductile conductive metal (e.g. copper or aluminium) tube which is longitudinally welded and swaged down over the steel wire arch; an insulating sheath of thermoplastics substance such as polyethylene.

The connection between two cable ends thus constituted is difficult to provide, since said connection performs three distinct functions:
end-to-end connection of the optical fibers of both cables, leaving a sufficient excess length to avoid breakage of the fibers under the effect of unexpected traction;
mechanical continuity of the arches of steel wires which provide the cable with its tensile strength; and
watertight sealing against the high pressure prevailing at great depths.

In accordance with suggestions previously made, such connections have already been described by the Applicant. These connections have: fixing parts on which the ends of cables are fixed; a mandrel on which the excess length of optical fiber is wound; a container tube which surrounds the mandrel and which mechanically connects the fixing parts. Said configuration therefore obliges the operator to firstly connect the optical fibers and then to mechanically connect the ends of the cables. This obviously presents a danger of breakage.

Preferred embodiments of the invention make it possible to remedy said disadvantage by producing a connection which makes it possible firstly to mechanically connect the cable ends and secondly to connect the optical fibers without danger of breaking them accidentally or by improper operation.

Preferred embodiments of the invention also provide a simple connection and method to allow the connection to be wound onto a davit while providing high mechanical strength, proper sealing by means of a water-repellent substance and good electric insulating by using sheaths made of thermoplastic substances.

SUMMARY OF THE INVENTION

The present invention provides a connection for connecting the ends of two submerged optical fiber cables, each cable comprising an optical fiber core over which an arch of steel wires is helically wound, a conductive metal tube swaged down on the arch and an insulating sheath, said connection comprising, at each cable end:
(a) A fixing part which is at least partially made of a metal having high mechanical strength, said fixing part having a bore which includes a conical portion at its end facing the end of the other cable and a cylindrical portion at its opposite end, said cylindrical portion accomodating the swaged down tube and said conical portion receiving the ends of the steel wires;
(b) A conical wedge for splaying out the arch-forming steel wires and jamming them in the conical portion of the bore, said wedge having an axial passage which accommodates the optical core;
(c) A hardenable synthetic resin plug which fills the free space between the surface of the fixing part bore and the outer surface of the conical wedge and surrounding the ends of the arch-forming wires;

The improvement wherein at least one of the fixing part has ports through which the optical fibers may pass out away from the cable axis and the connection also includes around the fixing parts:
(d) An inner tube made of a material having high mechanical strength and in whose central portion further ports are provided;

(e) In each port of the inner tube, a support wire on which a weld sleeve is fixed, each weld sleeve serving to connect a pair of optical fibers together;

(f) An outer tube which covers the inner tube.

Advantageously, the space left free inside the inner tube is filled with a viscous substance, such as polyisobutylene.

Preferably, the inner tube is provided with an orifice via which it may be filled and another orifice to vent air during filling.

Preferably a moulded seal of thermoplastic material connects the two insulating sheaths together.

It may further have two outer sleeves made of a synthetic substance.

In another aspect, the present invention provides a method of manufacturing a connection according to claim 1, in which:

(a) The optical cores and the arch-forming steel wires, the swaged conductive tubes and the insulating sheaths are all stripped from the connection zone along a very much longer length than that occupied by the final connection, leaving the optical fibers bare;

(b) The outer sleeve, the inner tube and the fixing part are threaded in that order onto one end of the cable while the outer sleeve, the outer tube and the fixing part are threaded in that order onto the other end of the cable;

(c) The arch forming steel wires, the tubes and the insulating sheaths are cut to length as required for the connection;

(d) Hardenable synthetic resin is inserted into the conical portions of the bores through the fixing parts, and the ends of the arch-forming steel wires are splayed out inside said conical portions;

(e) The wedges for splaying out the steel wires are inserted into the fixing parts, so that the entire volume between the ends of the steel wires and the wedges is filled with synthetic resin which is then made to harden;

Wherein in said method:

(f) The optical fibers are passed out through the various ports formed in at least one of said fixing parts;

(g) Mechanical connection is provided by locating the inner tube over the two fixing parts and by screwing it onto at least one of said fixing parts;

(h) The optical fibers are passed through the various ports provided through the central portion of the inner tube;

(i) The optical fibers are then welded on to one and the welds are protected by sleeves, said sleeves then being fixed on support wires by tapes;

(j) Each support wire is placed in an outer groove in the inner tube, each sleeve thus being slung across a part of the inner tube;

(k) The outer tube is brought up to a filling orifice and an orifice for communicating with the outside air which orifices are provided in the inner tube;

(l) The free space inside the outer tube is filled and then said outer tube is permanently installed and made fast.

Advantageously, said free space is filled with a viscous substance, preferably polyisobutylene.

Preferably, the two insulating sheaths are connected together by thermoplastic moulding.

Preferably the device as a whole is covered by two outer sleeves made of a synthetic substance.

BRIEF DESCRIPTION OF THE DRAWINGS

A connection in accordance with the invention and a method of manufacturing it are described hereinafter by way of example with reference to the accompanying drawings. In each instance the cable has a return conductor covered by a protective sheath.

FIG. 6 is a view similar to FIG. 5 showing the finished connection.

MORE DETAILED DESCRIPTION OF THE INVENTION

Figure 1:
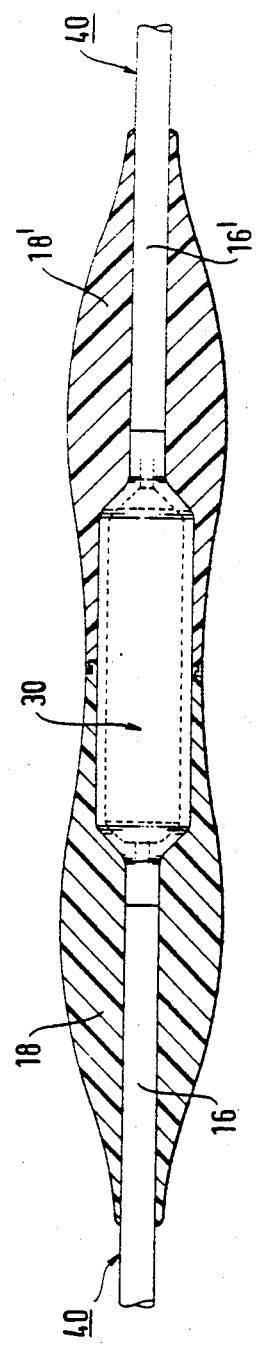
FIG. 1 is a partially cut-away section through a connection as a whole once completed.

FIG. 1 is a partially cut-away section through a completed connection between two portions of cable 40 having outer insulating sheaths 16, 16'. The connection per se 30 comprises a cylindrical housing which is covered by two tapering sleeves 18 and 18' which prevent excessive cable flexing in the vicinity of the connection.

Figure 2:
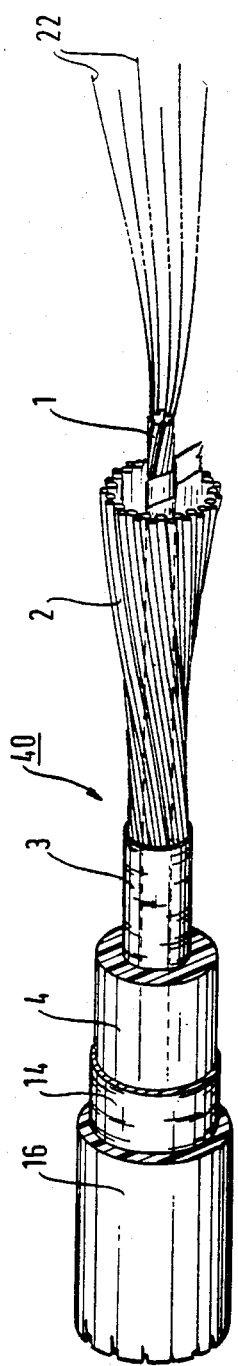
FIG. 2 is a perspective view of the end of a cable showing its various components and approximately full-scale.

FIG. 2 is a perspective view of the end of the cable 40 showing its component parts. The cable 40 comprises an optical core 1 housing optical fibers 22, an arch of steel wires 2 wound helically round the fiber-containing core 1, a copper tube 3 swaged down over the arch of steel wires 2, an insulating sheath 4, a return conductor 14 and the outer insulating sheath 16.

Figure 3:
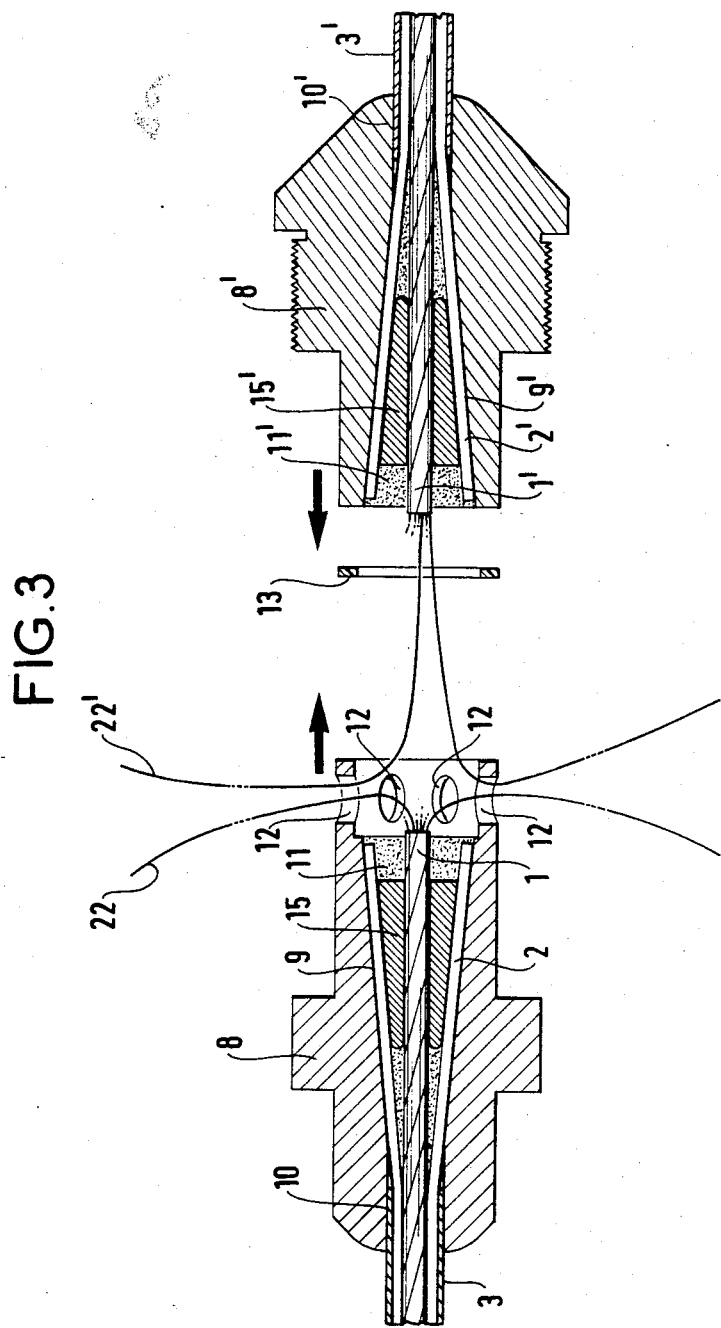
FIG. 3 is a schematic longitudinal section showning how fixing parts are positioned on two cable ends to be connected.

FIG. 3 shows the ends of the cable 40 received in a fixing part 8. The part 8 has a bore with a cylindrical portion 10 which accommodates the copper tube 3 and a conical portion 9 which accommodates the steel wires 2 which are splayed out by a conical wedge 15. A moulded plug 11 made of hardenable synthetic resins fills the free space left by the wedge 15 between the steel wires 2 and the optical core 1.

A similar arrangement obtains for the other portion of cable 40 which is received in a fixing part 8' having a bore with a cylindrical portion 10' accommodating a copper tube 3' and a conical portion accommodating the steel wires 2' as splayed out by a conical wedge 15'. A moulded plug 11' made of hardenable synthetic resin fills the free space left by the wedge 15' between the steel wires 2' and the optical core 1'. The main differences between the two cable ends to be joined concern the outside shapes of the fixing parts 8 and 8'.

The optical fibers 22 and 22' from the two portions of cable 40 pass radially outwardly through ports 12 in the fixing part 8. A washer 13 made of an elastomer is interposed between the ends of the two connection parts.

Figure 4:
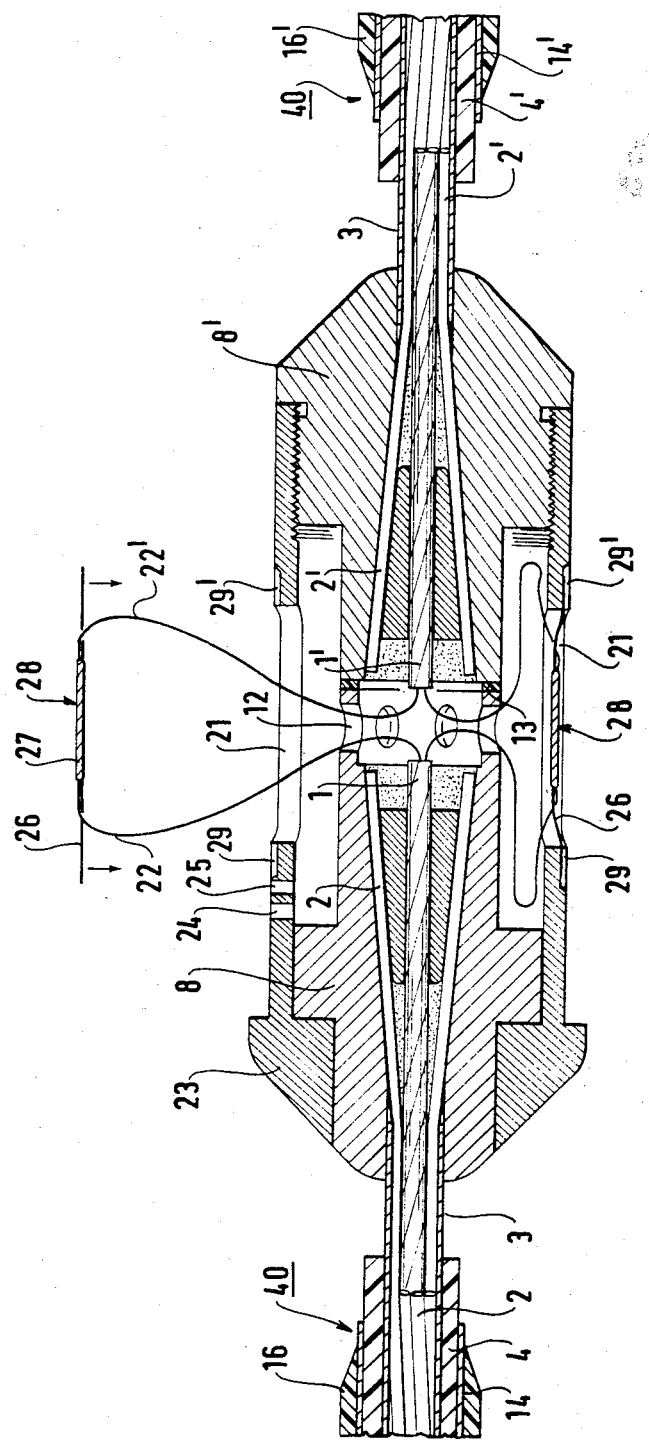
FIG. 4 is a section similar to FIG. 3 showing how the fixing parts are mechanically interconnected and how the optical fibers are joined together.

In FIG. 4, the two fixing parts 8 and 8' are mechanically connected by an inner tube 23 which is slid over the touching parts 8 and 8' from the same ends as the part 8, and which screws outo the part 8'. Mating steps on the part 8 and in the inside wall of the inner tube 23 serve to hold the part 8 against the screwed in part 8'. The elastomer washer 13 serves to compensate for slight dimensional inaccuracies in the machine of the parts 8 and 8' and the inner tube 23, thereby keeping manufacturing costs down.

Said figure shows two sleeves 28 for joining respective pairs of fiber ends. The sleeve 28 at the top of the figure is shown in its fiber-joining position while the sleeve 28 at the bottom of the figure is shown in its final position inside a port 21, through the wall of the inner tube 23.

The optical fibers 22 are welded one to one to optical fibers 22' with a sleeve 28 covering each welded connection. Each sleeve 28 is then fixed by a tape 27 onto a support thread 26 and then the ends of the thread 26 are received in two grooves 29, 29' machined at each end of each of the ports 21, so that the sleeves 28 are slung hammock like in the ports 21.

Two orifices 24 and 25 drilled radially through the inner tube 23 serve to fill the tube with a water-repellent substance such as polyisobutylene.

FIG. 4 also shows, at each end of the inner tube 23, the arches of steel wires 2 and 2', the copper tubes 3 and 3', the insulating sheaths 4 and 4', the return conductor 14 and 14', and the outer insulating sheaths 16 and 16' of the two portions of cable 40.

Figure 5:
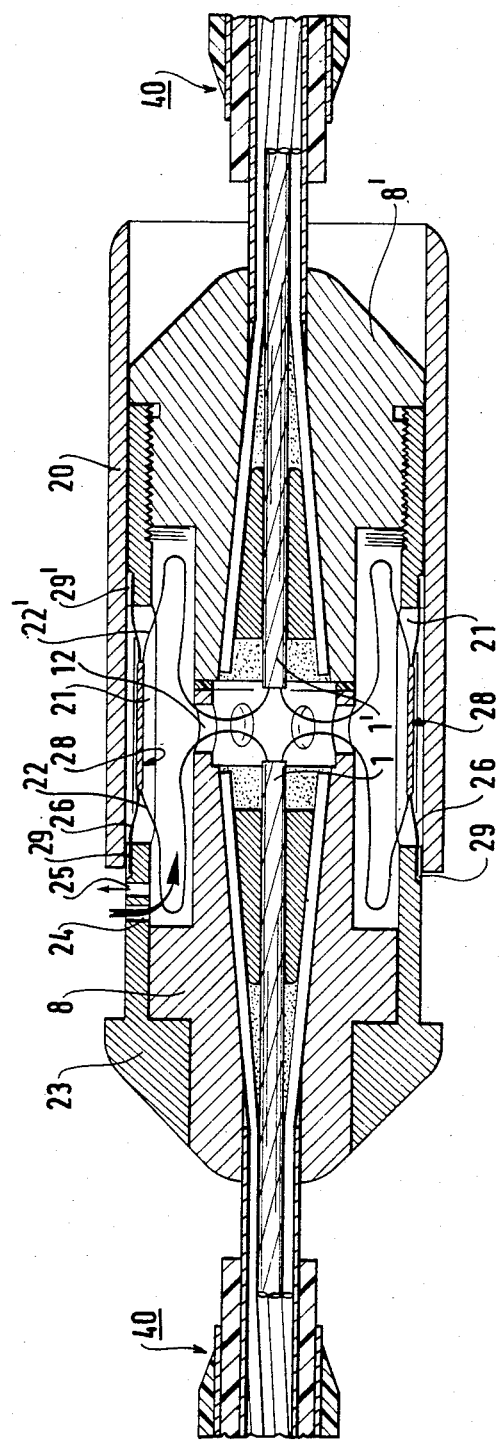
FIG. 5 is a view similar to FIG. 4 showing a filling operation.

In FIG. 5, an outer tube 20 slid over the connection from the same end an the part 8' partially covers the inner tube 23, leaving the orifices 24 and 25 free.

The orifice 24 serves to fill the inner tube 23 with polyisobutylene while the orifice 25 serves to vent the inner tube 23 to the outside so as to prevent air bubbles from being trapped inside it during filling.

In FIG. 6, filling with polyisobutylene is finished. The tube 20 is therefore slid to completely cover the inner tube 23. Said tube 20 is made fast by punching at 34.

The insulating sheaths 4 and 4' are connected together by a sealing mould 31 of plastics material.

The return conductors 14 and 14' are connected together by a conductive metal braid 32 and, thus reconstituted, serve to earth the device so as to protect operators and also as a return path for repeater power supply current.

The two protective sheaths 16 and 16' are connected together by a heat-shrinkable sleeve 33.

The connection which has just been described is manufactured as follows:

(a) The optical cores 1 and 1', the arch-forming steel wires 2 and 2', the swaged copper tubes 3 and 3', and the insulating sheaths 4 and 4' are all stripped from the connection zone along a very much longer length than that occupied by the final connection, leaving the optical fibers bare.

(b) The outer sleeve 18, the inner tube 23 and the fixing part 8 are threaded in that order onto one end of the cable 40, while the outer sleeve 18', the outer tube 20 and the fixing part 8' are threaded in that order onto the other end of the cable 40.

(c) The arch-forming steel wires 2 and 2', the tubes 3 and 3' and the insulating sheaths 4 and 4' are cut to length as required for the connection.

(d) Hardenable synthetic resin is inserted into the conical portions 9 and 9' of the bores through the fixing parts 8 and 8' and the ends of the arch-forming steel wires 2 are splayed out inside said conical portions.

(e) The wedges 15 and 15' for splaying out the steel wires are inserted into the fixing parts, so that the entire volume between the ends of the steel wires and the wedges is filled with synthetic resin which is then made to harden.

(f) The optical fibers are passed out through the various ports 12 formed in the fixing part 8.

(g) Mechanical connection is provided by locating the inner tube over the two fixing parts 8, 8' and by screwing it onto the fixing part 8'

(h) The optical fibers are passed through the various ports 21.

(i) The optical fibers are then welded one-to-one and the welds are protected by the sleeves 28; the sleeves are then fixed on support wires 26 by tapes 27.

(j) Each support wire is placed in a groove 21.

(k) The outer tube 20 is brought up to the orifice 25.

(l) The inside of said tube is filled with a water-repellent substance such as polyisobutylene and the outer tube is permanently installed and made fast by punching at 34.

(m) The insulating sheaths 4 and 4' are connected together by the thermoplastic moulding 31.

(n) The return conductors are connected together by means of the conductive metal braid 32.

(o) The two protective sheaths 16 and 16' are connected together by means of the heat-shrinkable sleeve 33.

(p) The assembly thus formed is covered by the two outer sleeves 18 and 18' made of a synthetic substance.

Without going beyond the scope of the invention, the cable ends need not have any return conductors.

I claim:

1. A connection for connecting the ends of two submerged optical fiber cables, each cable comprising an optical fiber core housing a plurality of optical fibers, over which an arch of steel wires is helically wound, a conductive metal tube swaged down on the arch and an insulating sheath, said connection comprising at each cable end:

(a) a fixing part which is at least partially made of a metal having high mechanical strength, said fixing part having a bore which includes a conical portion at its end facing the end of the other cable and a cylindrical portion at its opposite end, said cylinrical portion accommodating the swaged down tube and said conical portion receiving the ends of the steel wire;

(b) a conical wedge splaying out the arch-forming steel wires and jamming them in the conical portion of the bore, said wedge having an axial passage which accommodates the optical core;

(c) a hardened synthetic resin plug filling the free space between the surface of the fixing part bore and the outer surface of the conical ring and surrounding the ends of said arch-forming wires and embedding the ends of said arch-forming wires and said conical ring in hardened resin and effecting a high-strength mechanical connection between said steel wires and said fixing part;

the improvement comprising at least one of the fixing parts having first radial ports longitudinally beyond said resin plug towards the end of the other cable, through which optical fibers pass out radially from the cable axis to facilitate connections between optical fibers passing out said radial ports around the fixing parts;

(d) an inner tube made of a material having high mechanical strength and forming a central portion provided with second radial ports'

(e) a welded sleeve fixed to said inner tube and positioned on each second port of the inner tube, each weld sleeve serving to connect a pair of optical fibers together; and (f) an outer tube covering the inner tube.

2. A connection according to claim 1, wherein the space left free inside the inner tube including the volume about said weld sleeves is filled with a viscous polyisobutylene substance.

3. A connection according to claim 2, wherein the inner tube is provided at one end with an orifice via which it may be filled and another adjacent vent orifice to vent air during filling, and said connection further comprises an outer tube in slidable sealing contact with said inner tube and overlying said inner tube, thereby sealing off said orifices after filling.

4. A connection according to claim 1, wherein a moulded seal of thermoplastic material connects the two insulating sheaths together.

5. A connection according to claim 1, wherein each cable has a return conductor, and said connection further includes a conductive metal braid which connects the return conductors together.

6. A connection according to claim 1, in which each cable has a return conductor covered by a protective sheath, and wherein a heat-shrinkable sleeve which connects said protection sleeves together.

7. A connection according to claim 1, wherein the connection has two outer sleeves made of a synthetic substance.

8. In a method of manufacturing a connection for connecting the ends of two submerged optical fiber cables, wherein each cable comprises an optical fiber core housing a plurality of optical fibers, over which an arch of steel wires is helically wound, a conductive metal tube swaged down on the arch and an insulating sheath, said method comprising the steps of:

(a) stripping the optical cores and the arch-forming steel wires, the swaged conductive tubes and the insulating sheaths from the connection zone along a very much longer length than that occupied by the final connection, leaving the optical fibers bare;

(b) threading an outer sleeve, an inner tube and a fixing part in that order onto one end of the cable and threading the outer sleeve, the outer tube and a fixing part in that order onto the other end of the cable;

(c) cutting the arch-forming steel wires, the tubes and the insulating sheaths to a length required for the connection;

(d) splaying out the ends of the arch-forming steel wires inside said conical portions and inserting the wedges to maintain the steel wires splayed out;

(e) filling a hardenable synthetic resin in the conical portions of the bores through the fixing parts and filing the entire volume between the ends of the arch-forming steel wires and the wedges with said hardenable synthetic resin and hardening the same;

the improvement wherein at least one of said fixing parts includes at the end proximate to the other fixing part a plurality of first radial ports and wherein said inner tube includes a plurality of second radial ports and a filling orifice and a venting orifice therein, and said method further comprises the steps of:

(f) passing the optical fibers out through said first radial ports formed in said at least one of said fixing parts;

(g) locating the inner tube over the two fixing parts and screwing it onto at least one of said fixing parts to effect a mechanical connection therebetween;

(h) passing the optical fibers through said second radial ports provided within the inner tube;

(i) welding the optical fibers one-to-one and fixing sleeves on the optical fiber welds for protecting the welds and fixing said sleeves on support threads by tapes;

(j) placing each support thread in an outer groove in the inner tube such that each sleeve is hammock slung across a second port of said inner tube;

(k) sliding the outer tube longitudinally up to said filling orifice and said venting orifice for communicating with the outside air provided within the inner tube; and (l) filling the free space inside the outer tube with a viscous substance through said filling orifice and then sliding said outer tube over said inner tube to completely seal said orifice and permanently installing and making fast the outer tube.

9. A method according to claim 8, further comprising the step of connecting the two insulating sheaths together by thermoplastic moulding.

10. A method according to claim 8, wherein each cable has a return conductor, and wherein the method comprises the further step of connecting said return conductors together by a braid.

11. A method according to claim 8, wherein each cable has a return conductor covered with a protective sheath, and wherein said method further comprises the step of connecting together said protective sheaths by a heat shrinkable sleeve.

12. A method according to claim 8, further comprising the step of covering the device as a whole by two outer sleeves made of a synthetic substance.

* * * * *